(12) United States Patent
Wyne

(10) Patent No.: US 6,907,832 B2
(45) Date of Patent: *Jun. 21, 2005

(54) GRANULAR MATERIAL SPREADER ATTACHMENT FOR MOWER OR OTHER APPARATUS

(76) Inventor: Mark W. Wyne, 2667 Christy Ave., Wildwood, MO (US) 63040

( * ) Notice: Subject to any disclaimer, the term of this patent is extended or adjusted under 35 U.S.C. 154(b) by 0 days.

This patent is subject to a terminal disclaimer.

(21) Appl. No.: 10/683,208

(22) Filed: Oct. 9, 2003

(65) Prior Publication Data

US 2004/0069194 A1 Apr. 15, 2004

Related U.S. Application Data

(63) Continuation-in-part of application No. 10/144,869, filed on May 13, 2002, now Pat. No. 6,637,678, which is a continuation-in-part of application No. 09/480,575, filed on Jan. 10, 2000, now Pat. No. 6,502,771, which is a continuation-in-part of application No. 09/175,043, filed on Oct. 19, 1998, now abandoned.

(60) Provisional application No. 60/290,607, filed on May 14, 2001, and provisional application No. 60/061,895, filed on Oct. 14, 1997.

(51) Int. Cl.[7] ............................ E01C 19/20; A01C 7/08
(52) U.S. Cl. ....................................... 111/130; 239/663
(58) Field of Search ........................ 111/130–133, 11, 111/12, 13; 239/650, 661, 663–666, 668, 681, 683; 221/185; 222/159

(56) References Cited

U.S. PATENT DOCUMENTS

| | | |
|---|---|---|
| 3,082,007 A | 3/1963 | Johnson |
| 3,523,648 A | 8/1970 | Garber |
| 3,982,697 A | 9/1976 | Maples |
| 4,063,748 A | 12/1977 | Schmidt |
| 4,289,256 A | 9/1981 | Bailey |
| 4,688,819 A | 8/1987 | Reilly et al. |
| 4,725,004 A | 2/1988 | Baran |
| 4,744,580 A | 5/1988 | Ryan |
| 4,798,325 A | 1/1989 | Block |
| 5,106,002 A | 4/1992 | Smith |
| 5,106,020 A | 4/1992 | Harrell |
| 5,190,218 A | 3/1993 | Kayser |
| 5,195,308 A | 3/1993 | Grote |
| 5,237,803 A | 8/1993 | Domingue |
| 5,375,773 A | 12/1994 | Lewis |
| 5,423,565 A | 6/1995 | Smith |
| 5,533,676 A | 7/1996 | Conley |
| 6,047,909 A | 4/2000 | Simpson |
| 6,089,478 A | 7/2000 | Truan et al. |
| 6,422,490 B1 | 7/2002 | Truan et al. |
| 6,502,771 B1 | 1/2003 | Wyne |

*Primary Examiner*—Robert E Pezzuto
(74) *Attorney, Agent, or Firm*—Paul M Denk

(57) ABSTRACT

A granular material spreader for a mower other a apparatus including a support column, having a support plate attached to its bottom, for supporting the spreader thereon, the spreader being mounted to the shaft of the motor which when energized turns the spreader for usage. A bracket attaching to the support column supports the hopper, for holding granular material, the bottom of the hopper including a series of apertures, and a control plate, to regulate the dispensing and spreading of granular material. A pivot lever energized to a solenoid initiates the dispensing, or containment, of spreading of granular material. The control plate includes an adjustment further regulating the amount of granular material dispensed from the hopper.

13 Claims, 2 Drawing Sheets

GRANULAR MATERIAL SPREADER ATTACHMENT FOR MOWER OR OTHER APPARATUS

CROSS-REFERENCE TO RELATED APPLICATION

This application is a continuation-in-part patent application based upon the prior provisional application filed on May 14, 2001, having Ser. No. 60/290,607; and which now is Pat. No. 6,637,678, having Ser. No. 10/144,869, which was filed on May 13, 2002, and this application is a continuation-in-part of the applicant's prior application having Ser. No. 09/480,575, filed on Jan. 10, 2000; which is now Pat. No. 6,502,771, which application is a continuation-in-part of the application having Ser. No. 09/175,043, filed on Oct. 19, 1998 now abn.; and which application derives from the provisional patent application filed on Oct. 14, 1997, under Ser. No. 60/061,895, all of said applications being owned by the same applicant.

BACKGROUND OF THE INVENTION

There are a variety of various styles of lawn mowers and other apparatuses used both domestically, commercially, and for all facets of maintaining efficient lawn care, but predominantly, most of the more durable type of riding mower arrangements are employed by the commercial lawn care organizations, and may include further and additional accessories, in the nature of spreaders, sprayers, and the like, for the processing and handling of complete lawn care during performance of such procedures. An example of apparatuses that may be utilized in conjunction with some type of a moveable vehicle, such as a lawn mower, spreader, roller, or the like, and which includes accessories for facilitating the further treatment of the lawn, such as with the spreading or spraying of fertilizer, herbicide, or the like, can be seen in a variety of prior art patents. For example, one such patent is shown in the Maples U.S. Pat. No. 3,982,697, which is upon a spraying apparatus, per se, which is attached to and used in conjunction with a mowing apparatus, as can be noted.

The patent to Harrell, U.S. Pat. No. 5,106,020, discloses another form of a spray attachment for lawn mowers.

The Grote, et al., U.S. Pat. No. 5,195,308, shows a mower having fluid dispersion characteristics.

A further U.S. Pat. No. 5,237,803, to Domingue, Jr., shows a centrifugal combination sprayer/cutter apparatus.

The Conley, U.S. Pat. No. 5,533,676, discloses a multi-purpose lawn care machine.

The Garber, U.S. Pat. No. 3,523,648, is upon a broadcast spreader attachment for garden tractors.

The Bailey, U.S. Pat. No. 4,289,256, discloses a tramlining device for seed drill.

The Baran, Jr., U.S. Pat. No. 4,725,004, shows another form of a spray unit.

The Block, U.S. Pat. No. 4,798,325, discloses a method and apparatus for applying liquid and dry lawn treatment materials.

The Smith, et al., U.S. Pat. No. 5,106,002, shows a hitch mounted carrier assembly and method.

The Kayser, et al., U.S. Pat. No. 5,190,218, shows another type of device for spraying liquids with a small tractor.

The current invention, on the other hand, provides an improved means for providing attachment for use upon a mower or other lawn care apparatus, and in particular automates the spreading of granular material, such as fertilizer, herbicide, insecticide, seed, or any other related type of material that needs dissemination, by means of a spreader, and in high volume over a large territory, in a minimum amount of time.

SUMMARY OF THE INVENTION

The principle of this invention is to provide means for furnishing stable mounting of a removable accessory to a mowing or spreading apparatus, generally of the riding type, or it may further be included upon the walk behind type of lawn care apparatus, so as to allow the lawn care worker to immediately place into operation a granular material spreader, simply upon the manipulation of a singular switch, to initiate such dissemination. A further principle of this invention improves upon the structure and functionality of a fertilizer, salt, sand, seed, pesticides or herbicides, or other minerals or other granular material spreader, of the type that is used in conjunction with a tractor, or riding mower, or even one which may be built into the structure of such an apparatus, so as to allow the operator to simply initiate the operations of the spreader, once installed, through the manipulation of a singular switch, either manually depressed by the hand or the foot, and which provides for both an opening and dispensing by the spreader, or to immediately cease such activity, upon this engagement of it's actuating switch.

This invention provides for the mounting of its various components to a support column, which may connect to the bracket mount normally associated with a lawn care apparatus, and to which attachments of this type may connect. The support column provides all the means for attachment of the various components that make up the spreader of this invention, including a base plate for attachment of the revolveable spreader, in addition to the motor that turns the same, the bracket for holding the granular material hopper in place, and the various operating components that provide for the quantity of material to be disseminated and spread, and limited to a full spreading, or only partial or minimum spreading, depending upon the type and functionality of the granular material being disseminated.

It is, therefore, the principle object of this invention to provide a granular material spreader for a mower that may be easily clamped on to the front or back hitch of a lawn care apparatus through a singular connection, and be immediately readied for use for spreading a variety of materials in the category of seed, fertilizer, herbicides, or any other type of granular material which requires dissemination.

Another object of this invention is to provide means for controlling the quantity of granular material being dispensed, automatically, through an adjustable setting.

Yet another object of this invention to provide for the close contact between the aperture plate, and the dispensing holes provided at the bottom of the hopper, so as to precisely control the amount of granular material being dispensed onto its associated spreader.

Still another object of this invention is to reduce and minimize the effort that must be employed by the serviceman, while utilizing a mowing or other related apparatus, allowing him/her to simply initiate the operations of, for example, the fertilizer spreader through a single actuation of an operating switch.

These and other objects may become more apparent to those skilled in the art upon reviewing the summary of the invention as provided herein, and upon undertaking a study of the description of it's preferred embodiment, in light of the drawings.

DESCRIPTION OF THE PREFERRED EMBODIMENT

Figure 1:
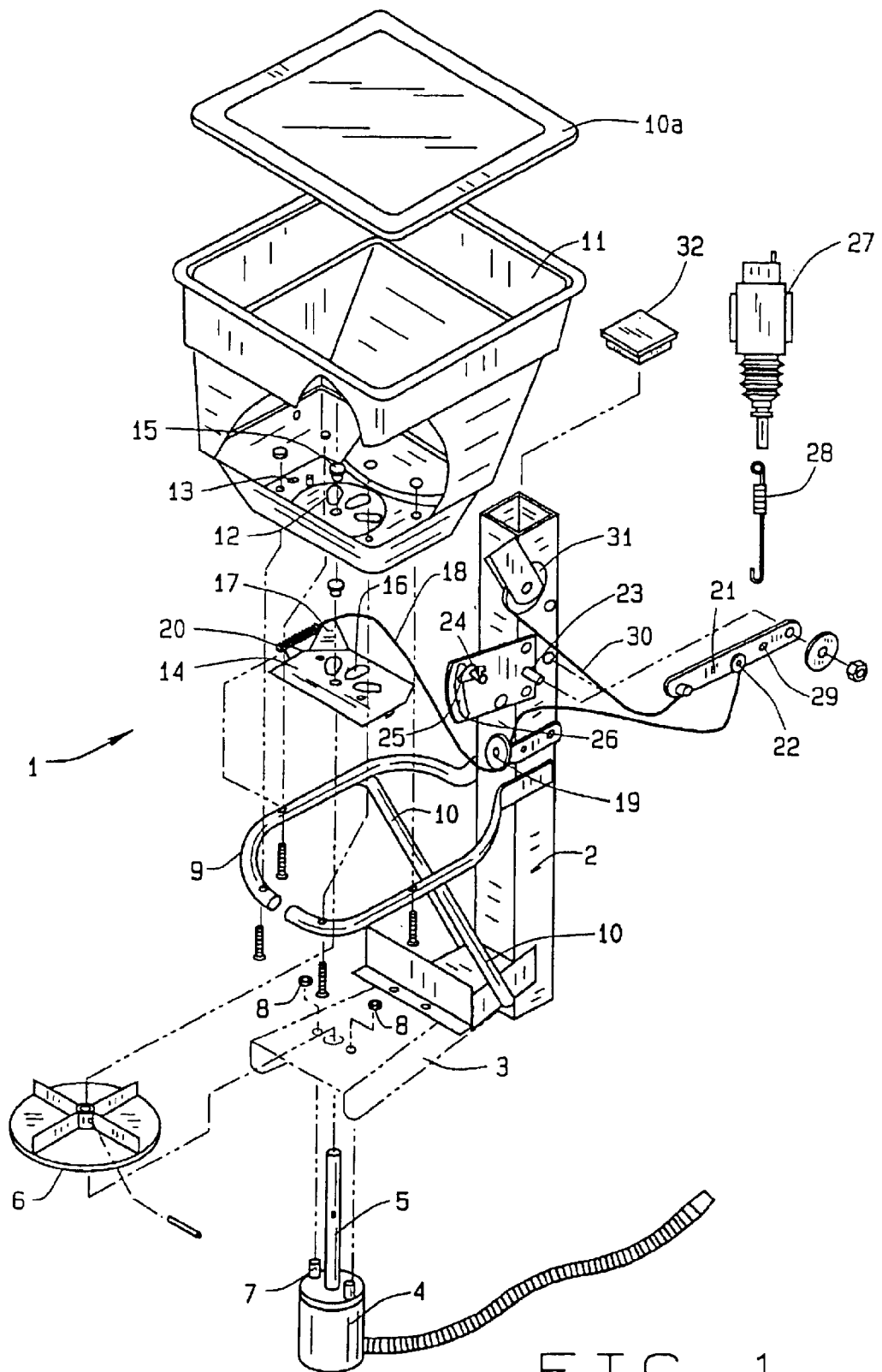
FIG. 1 is an exploded view of the granular material spreader for mower or other apparatus of this invention.

In referring to the drawing, and in particular FIG. 1, therein is shown the granular material dispenser 1 of this invention. Essentially, the primary support is provided by the support column 2, which at it's bottom, may include an angle column (not shown), which may secure with the bracket mount (not shown), normally provided at the front or back of a lawn care apparatus, such as a riding mower. Such a take off means is normally provided also upon a small tractor, which would allow the application of this spreader easily to such a device. Likewise, this spreader may be attached to a walk behind type of mower that has a similar type of takeoff connecting bracket secured with it, as known in the art. As an example, there are various types of riding or other forms of mowers that are manufactured and readily available from Earth Way Products, Inc., of Bristol, Ind.

The support column 2 includes, and has connected therewith, a base plate 3, which may be secured by a weld, bolts, or other means of connection, and extends forwardly thereof, as noted. The base plate includes reinforcing flanges, as can be seen, in order to provide further structural support, and strength, to this bracket, when employed in this manner. Connecting with the underside of the base plate 3 is the motor 4, whose shaft 5 extends upwardly, and has connected thereon the spreader 6 of the type as normally seen and employed in the trade. The motor can connect with the base plate by means of its bolts 7, secured in place by means of the fasteners 8, such as the nuts as shown.

Provided further upwardly upon the column support 2 is an embracing bracket 9, which likewise secures to either side of the support 2, and has a series of angulated brackets 10 extending upwardly therefrom, in order to provide full support, and the ability to withstand heavy downward pressures, that may be exerted upon the same by means of the hopper 11, which is supported by the brace 9, as can be understood. The hopper includes a cover 10a to allow for closure, of the interior of the hopper, once granular material, such as seed, or fertilizer, is applied therein.

The bottom of the hopper includes a series of aligned apertures, as at 12, which generally are arranged at equal radial distances from the approximate center of the hopper bottom 13, and while three such apertures are shown, more or less may be included. This provides the direct flow by gravity of any granular material deposited into the hopper downwardly, for impinging upon the rotating spreader 6, as can be understood.

To provide for control of the quantity of granular material being dispensed, a control plate 14 is pivotally secured by means of the pivot pin 15 to the bottom of the hopper, and the control plate includes a corresponding series of apertures 16 that normally close off the bottom of the hopper, unaligning themselves with the hopper apertures 12, but that when the control plate 14 is pivoted, and the apertures begin to align themselves, depending upon the degree of alignment, determines the amount of granular material to be dispensed downwardly from the hopper. The control plate includes an arm 17, extending off of one of it's corners, and a cable 18 connects therewith, and extends around a pulley 19, such that when the cable is pulled, the plate will pivot the various apertures into an opening condition, to allow for dispensing, but that when the cable is release or relaxed, the spring 20, which connects with the arm 17, and also by means of the fastener 21 to the brace 9, will pull the plate back into it's standard position, which normally closes off the bottom of the hopper, thereby preventing further material flow.

The control of the plate 14 through the cable 18 is undertaken by a pivotal lever 21. It can be seen that the cable 18 connects, at its opposite end, as at 22, to the said pivot lever. The pivot lever 21 connects by means of the pivot pin 23 to a lever support 24, and the extent of pivot of the lever 21, is regulated by means of the adjustment nut 25, which can be adjustably set within the slot 26, as can noted. A solenoid 27 connects by means of a link 28 to the aperture 29 of the pivotal link 21. Thus, when the solenoid is actuated, and the lever is pulled upwardly, it pulls upon the cable 18, pivoting the closure plate 14, to allow for some degree of alignment of the various apertures 12 and 16, as can be understood. The relative degree of opening between the apertures 12 and 16 is regulated by the extent of the pivot of the pivot link 21, controlled by the adjustment nut 25 that regulates the amount of pivot of the link relative to the setting of the nut 25 within its slot 26. And, when the solenoid is de-energized, and the pivot link 21 is allowed to drop, which may be achieved by any type of spring or other biasing action, or by gravity, the cable is relaxed, allowing the spring 20 to re-pivot the closure plate 14, thereby closing off the communication between the apertures 12 and 16, preventing the further flow of granular material.

The essence of this invention is to provide for the automatic control of the opening and closing of the control plate 14, through the manipulation of a single actuating control, or button, conveniently accessible to the operator, so that dispensing can be immediately initiated, or curtailed, by the operator. This is achieved through the usage of that control mechanism combining the solenoid 27, with the link means 28, which may comprise or incorporate a spring bias therein, which manipulates the pivot link 21, for tensioning or release of pressure upon the cable 18, that provides for that opening or closing of the alignment of the apertures 16, with respect to the hopper apertures 12, to some degree, depending upon the adjustment setting of the lever support 24, through the adjustment nut 25, as noted. It is this automation added to the structure and functionality of this granular material spreader attachment that greatly facilitates its usage when applied to a mower, or other apparatus, during usage.

Also provided upon the pivot link 21 is a further cable 30, looped around the pulley 31, which may allow for manual manipulation of the hopper openings, as can be understood.

The support column 2 also includes a closure cap, as at 32, to close off the top of the said column.

While the application as described herein, in the preferred embodiment, shows the usage of the solenoid being linked through a linking device, a pivotal link, a cable, through a spring, for actuation of the control plate, it is just as feasible, and likely, that the solenoid could be fabricated to connect onto some segment of the support column 2, or its lever support 24, and either connect directly to the control plate 14, or connect by means of any type of lever, or link rod, directly to the control plate 14, to provide for its actuation and pivot, and setting of the selected aperture(s) 16 in alignment with the bottom of the hopper, and its various apertures 12, to control the quantity and amount of granular material being dispensed, during operations of this granular material spreader.

Figure 2:
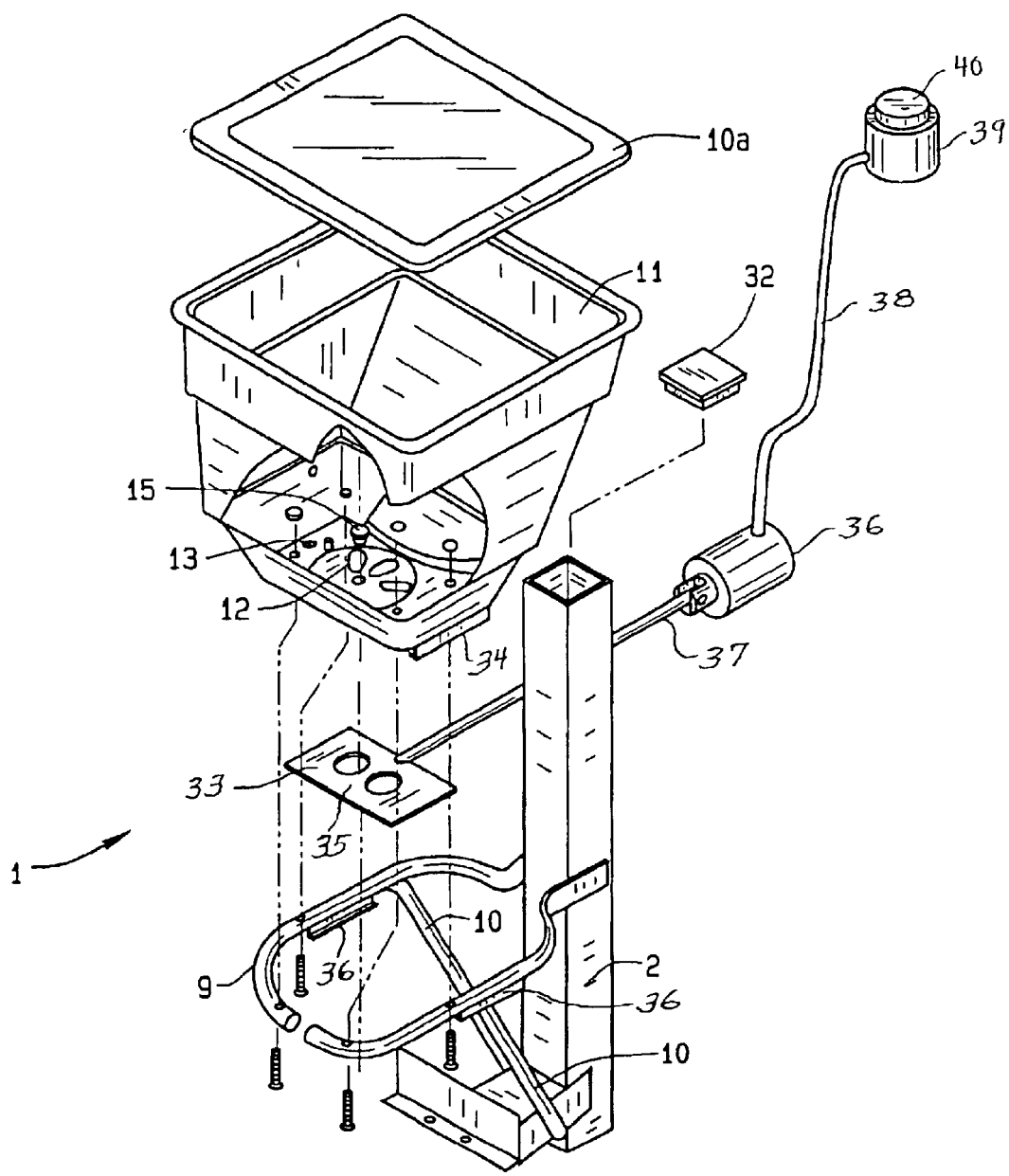
FIG. 2 is an exploded view of a modified granular material spreader for more or other apparatus of this invention.

An example of the modification as described above can be seen in FIG. 2. You can notice that there are similar components to the spreader as described with respect to FIG. 1 is shown in FIG. 2. As can be seen, similar components are identified in both drawings, having common structural relationship within their embodiments. But, the modification herein is to provide a different style of control plate, as at 33, this particular instance, the control plate is designed for lateral, longitudinal or any angular shifting relative to the bottom of the hopper 7 or shifting forwardly and rearwardly relative to the hopper brace 9, as can be noted. As shown, a pair of support angles, one as shown at 34, provided to either side of the bottom of the hopper, is designed for supporting shifting the control plate 33, as can be understood. Thus, the control plate may slide forwardly, or rearwardly, and thereby align one or more of its apertures, as at 35, with one or more of the apertures 12 provided at the bottom of the hopper, as can be noted. Actually, although about two or more apertures are shown in both of these components, a single aperture, which will align with a single aperture through the bottom of the hopper, will provide precise control for the deposit of any granular material through the same, and for dropping onto the spreader 6, during operation.

In addition, it is likely that the control plate 33 may locate within the angle supports 36 provided upon the brace or bracket 9, and the plate can shift forwardly, and rearwardly, therein, for providing for full or partial alignment of the various apertures, for controlling the amount of granular material that drops therethrough and is disseminated and spread by the spreader 6, as can be understood.

In addition, the control of the control plate 33, and which is the significant part of this particular invention, is the usage of electromechanical means for shifting the plate, from a position in proximity with the rider upon the tractor or mower, so that he/she need not inquire self removal from the mower, each time an adjustment is required in the amount of granular material being dispensed from the apparatus. Hence, a motor, or any type of solenoid, as shown at 36, may control a wire within the cable 37, to provide for the precise movement of the control plate 33, within its support structure, as identified. Actually, the solenoid 36 could be located just rearwardly of the control plate or forwardly thereof, connect directly to it, and be energized from a cable 38, from a control device 39. And, these electromechanical components could be rendered functional by any type of battery energy, an alternator from the tractor, or the like. In addition, it may be that the electromechanical means, such as a solenoid or a motor, could be located at the region of the member 39, and be actuated by its control button 40, to actuate the internal cable for movement of the control plate 33, forwardly or rearwardly, within its mount, to provide for the precise regulation and control of the amount of granular material being dispensed, from the apparatus. These are examples as to how this entire system can be automated, be operated by and for the convenience of the tractor driver from a sitting position, and not require removal from the same for regulating the amount of granular material being dispensed.

Variations or modifications to the subject matter of this invention may occur to those skilled in the art upon reviewing the disclosure as provided herein. Such variations, or modifications, if within the conception of this development, are intended to be embodied within the scope of the invention as disclosed. The description of the preferred embodiment, as provided herein, is done so for illustrative purposes only.

What is claimed is:

1. A granular material spreader for use in conjunction with, and installation to, an apparatus for spreading granular material onto a lawn, road, comprising, a bracket, said bracket provided for connecting to said apparatus, a granular material hopper, said granular material hopper being supported by said bracket, said granular material hopper having a bottom wall, said bottom wall incorporating at least one aperture therethrough, and provided for dispensing of granular material during operating of said spreader, a control plate, said control plate movably secured below and proximate to the bottom wall, said control plate including at least one aperture therethrough, and upon its shifting, providing for alignment the hopper bottom wall aperture with the control plate at least one aperture to regulate the quantity of dispensing of granular material from the spreader during its operation, an electromechanical means, said electromechanical means being operatively associated with the apparatus, and interconnecting with the control plate, such that upon energziation of the electromechanical means it regulates the degree of shifting of the control plate relative to the bottom of the hopper to provide for control in the quantity of dispensing of the granular material from the spreader during its operation.

2. The granular material spreader of claim 1 wherein the electromechanical means comprises a motor.

3. The granular material spreader of claim 1, wherein the electromechanical means comprises a solenoid.

4. The granular material spreader of claim 1 wherein the electromechanical means is arranged adjacent the control plate, switch means provided proximate the location of any driver upon the granular material spreader, whereby actuation of the switch means regulates the functioning of the electromechanical means for shifting of the control plate.

5. The granular material spreader of claim 4 wherein the electromechanical means is a solenoid.

6. The granular material spreader of claim 4, wherein the electromechanical means is a motor means.

7. The granular material spreader of claim 1 wherein the electromechanical means is located proximate any driver located upon the spreader, said switch means provided for controlling the operations of the electromechanical means, and a cable interconnecting between the electromechanical means and the control plate to provide for the shifting of said control plate to regulate the amount of dispensing of granular material from the spreader during its operation.

8. The granular material spreader of claim 7 wherein the electromechanical means is a solenoid.

9. The granular material spreader of claim 7 wherein the electromechanical means is a motor.

10. The granular material spreader of claim 4 wherein said control plate shifts longitudinally.

11. The granular material spreader of claim 7 wherein said electromechanical means shift longitudinally.

12. The granular material spreader of claim 4 wherein said electromechanical means pivotally shifts the control plate.

13. The granular material spreader of claim 7 wherein said electromechanical means pivotally shifts the control plate.

* * * * *